United States Patent
Avula et al.

(10) Patent No.: US 11,051,172 B2
(45) Date of Patent: Jun. 29, 2021

(54) PRIVATE WIRELESS NETWORK GUEST ACCESS

(71) Applicant: Cisco Technology, Inc., San Jose, CA (US)

(72) Inventors: Raghavaiah Avula, Milpitas, CA (US); Akram Ismail Sheriff, San Jose, CA (US); Santosh Ramrao Patil, Santa Clara, CA (US); Gangadharan Byju Pularikkal, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 7 days.

(21) Appl. No.: 16/539,428

(22) Filed: Aug. 13, 2019

(65) Prior Publication Data
US 2021/0051478 A1 Feb. 18, 2021

(51) Int. Cl.
*H04W 76/14* (2018.01)
*H04W 12/086* (2021.01)
(Continued)

(52) U.S. Cl.
CPC ....... *H04W 12/086* (2021.01); *H04L 63/0272* (2013.01); *H04W 8/18* (2013.01);
(Continued)

(58) Field of Classification Search
CPC ............. H04W 12/0806; H04W 76/14; H04W 12/004; H04W 8/18; H04W 12/06; H04W 48/16
See application file for complete search history.

(56) References Cited

U.S. PATENT DOCUMENTS

| 8,737,957 B2 | 5/2014 | Raleigh |
| 9,277,392 B2 | 3/2016 | Lee et al. |

(Continued)

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 16)", 3GPP TS 24.301 V16.1.1, Jun. 2019, 549 pages.

(Continued)

*Primary Examiner* — Sam Bhattacharya
(74) *Attorney, Agent, or Firm* — Edell, Shapiro & Finnan, LLC (57) ABSTRACT

In one example, a wireless Access Point (AP) is configured to provide network connectivity between a User Equipment (UE) and a private wireless network. The wireless AP obtains, from the private wireless network, an indication that the UE is unregistered with the private wireless network. In response to the indication that the UE is unregistered with the private wireless network, the wireless AP provides, to the private wireless network, an indication to initiate an emergency attach procedure with respect to the UE. In response to the indication to initiate the emergency attach procedure, the wireless AP obtains, from the private wireless network, an indication that the UE is authorized to access the private wireless network. In response to the indication that the UE is authorized to access the private wireless network, the wireless AP provides guest access to the private wireless network on behalf of the UE.

20 Claims, 5 Drawing Sheets

(51) Int. Cl.

| | | |
|---|---|---|
| *H04W 48/16* | (2009.01) | |
| *H04W 8/18* | (2009.01) | |
| *H04L 29/06* | (2006.01) | |
| *H04W 12/06* | (2021.01) | |
| *H04W 12/40* | (2021.01) | |
| *H04W 12/72* | (2021.01) | |
| *H04W 48/18* | (2009.01) | |

(52) U.S. Cl.
CPC ........... *H04W 12/06* (2013.01); *H04W 12/40* (2021.01); *H04W 12/72* (2021.01); *H04W 48/16* (2013.01); *H04W 76/14* (2018.02); *H04W 48/18* (2013.01)

(56) References Cited

U.S. PATENT DOCUMENTS

| | | | |
|---|---|---|---|
| 10,021,558 | B2 | 7/2018 | Lalwaney |
| 2012/0057464 | A1* | 3/2012 | Nakata ................. H04L 45/00 370/237 |
| 2012/0135713 | A1* | 5/2012 | Lee ..................... H04W 8/02 455/411 |
| 2012/0327912 | A1* | 12/2012 | Kirveskoski ...... H04W 72/0446 370/336 |
| 2015/0350912 | A1 | 12/2015 | Head et al. |
| 2017/0048645 | A1* | 2/2017 | Yerrabommanahalli ................... H04L 61/106 |
| 2017/0105171 | A1* | 4/2017 | Srivastava .............. H04W 4/70 |
| 2017/0150362 | A1* | 5/2017 | Clemenson ........... H04W 4/029 |
| 2020/0221542 | A1* | 7/2020 | Bitran ............. H04W 12/00305 |

OTHER PUBLICATIONS

CISCO Systems, Inc., "MME Administration Guide, StarOS Release 20," first published Mar. 31, 2016, last modified Aug. 8, 2016, 512 pages.
Wikipedia, "Citizens Broadband Radio Service", https://en.wikipedia.org/wiki/Citizens_Broadband_Radio_Service, last edited Jun. 12, 2019, 4 pages.
GSMA, "The what and how of Remote SIM Provisioning", eSIM Whitepaper, Mar. 2018, 21 pages.
GSM Association, "GSMA SAS Standard for Subscription Manager Roles", Version 3.0, Mar. 31, 2017, 33 pages.
Hill, Kelly, "What is private LTE?", https://www.rcrwireless.com/20180703/fundamentals/what-is-private-lte-tag6-tag99, Jul. 24, 2018, 3 pages.
Wikipedia, Network Access Device, https://en.wikipedia.org/wiki/Network_Access_Device, last edited Apr. 22, 2019, 1 page.
Brown, Gabriel, "Private LTE Networks", Jul. 2017, 11 pages.
Wikipedia, "Radius", https://en.wikipedia.org/wiki/RADIUS, last edited Jul. 16, 2019, 18 pages.
Wikipedia, "System Architecture Evolution", https://en.wikipedia.org/wiki/System_Architecture_Evolution, last edited Jun. 6, 2019, 8 pages.

* cited by examiner

PRIVATE WIRELESS NETWORK GUEST ACCESS

TECHNICAL FIELD

The present disclosure relates to telecommunications technology.

BACKGROUND

Private wireless networks can provide network connectivity services to individual entities such as enterprises. A private wireless network can use dedicated network functions to provide improved network performance (e.g., decreased latency) to a given entity. Private Long Term Evolution (LTE) networks, for example, provide network connectivity using dedicated fourth generation (4G) network functions.

DESCRIPTION OF EXAMPLE EMBODIMENTS

Overview

In one example embodiment, a wireless Access Point (AP) is configured to provide network connectivity between a User Equipment (UE) and a private wireless network. The wireless AP obtains, from the private wireless network, an indication that the UE is unregistered with the private wireless network. In response to the indication that the UE is unregistered with the private wireless network, the wireless AP provides, to the private wireless network, an indication to initiate an emergency attach procedure with respect to the UE. In response to the indication to initiate the emergency attach procedure, the wireless AP obtains, from the private wireless network, an indication that the UE is authorized to access the private wireless network. In response to the indication that the UE is authorized to access the private wireless network, the wireless AP provides guest access to the private wireless network on behalf of the UE.

Example Embodiments

Figure 1:
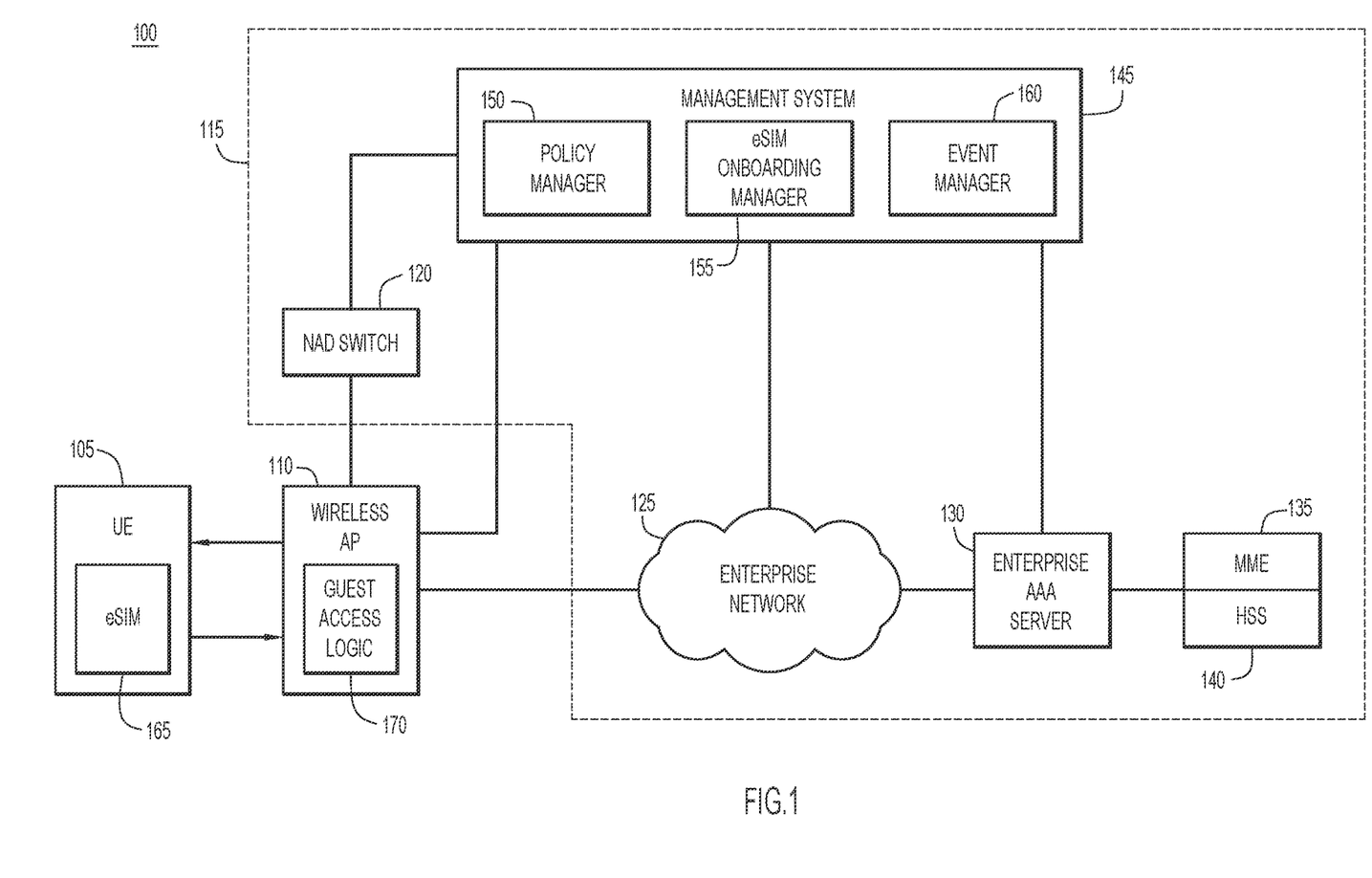
FIG. 1 illustrates a system configured to provide guest access to a private wireless network, according to an example embodiment.

FIG. 1 illustrates a system 100 configured to provide private wireless network guest access. System 100 includes User Equipment (UE) 105, wireless AP 110, and private wireless network 115. Private wireless network 115 may be a private Long Term Evolution (LTE) network, and includes Network Access Device (NAD) switch 120, enterprise network 125, enterprise Authentication, Authorization, and Accounting (AAA) server 130, Mobility Management Entity (MME) 135, and Home Subscriber Server (HSS) 140. Private wireless network 115 also includes a management system 145 that includes policy manager 150, embedded Subscriber Identity Module (eSIM) onboarding manager 155, and event manager 160.

In one example, UE 105 may be a mobile phone that includes eSIM 165. Unlike traditional removable/replaceable SIM cards, eSIM 165 is not designed for removability and therefore it is protected against physical theft. Whereas traditional SIM cards each correspond to a different network, and therefore need to be physically replaced when switching between different networks, eSIM 165 need not be physically replaced to allow UE 105 to switch between different networks. Instead, eSIM 165 stores multiple profiles, each corresponding to a different network. In one example, eSIM 165 has one dedicated profile for a service provider and one or two configurable profiles. Each profile may include a respective unique credential which enables access to (e.g., provides authentication for) the corresponding network. In one example, only one of the profiles may be selected at any given time.

Wireless AP 110 may be configured to provide network connectivity between UE 105 and private wireless network 115. In one example, wireless AP 110 may be a Citizens Broadband radio Service Device (CBSD) configured to provide network connectivity over the Citizens Broadband Radio Service (CBRS), a 150 MHz wide frequency band. Wireless AP 110 may communicate with UE 105 over a radio link, and NAD switch 120 may be configured to route traffic obtained from wireless AP 110 to various network entities. Enterprise network 125 may include one or more enterprise servers and networking devices (e.g., routers, switches, etc.) forming an enterprise intranet.

Enterprise AAA server 130 may perform security operations on behalf of enterprise network 125. MME 135 is configured to perform various control functions for private wireless network 115. HSS 140 may include a repository of user information. Management system 145 may be a CBRS management system. Policy manager 150 may provide networking policies to various entities in private wireless network 115. eSIM onboarding manager 155 may be responsible for onboarding operations associated with eSIM 165. Event manager 160 may react and respond to certain networking events, such as security issues.

In one example, UE 105 is associated with an on-premise non-employee user (e.g., a guest user), and is therefore unregistered with private wireless network 115. It may be undesirable to permit UE 105 to access private wireless network 115 with the same level of privileges as an enterprise employee, as this might enable unauthorized access to sensitive information stored in enterprise network 125. Conventionally, however, unregistered UE 105 would not be permitted even limited (guest) access to private wireless network 115. That is, any interaction between UE 105 and HSS 140 would fail, because UE 105 is not registered with HSS 140. Accordingly, the wireless AP is configured with guest access logic 170 to grant guest access of UE 105 to private wireless network 115.

Briefly, in one example, UE 105 may provide to private wireless network 115 (via wireless AP 110) a request to join private wireless network 115 (e.g., an attach request message). Private wireless network 115 may determine that UE 105 is unregistered with private wireless network 115, and wireless AP 110 may obtain, from private wireless network 115, an indication that UE 105 is unregistered with private wireless network 115 (e.g., an attach reject message). In response to the indication that UE 105 is unregistered with private wireless network 115, wireless AP 110 may provide, to private wireless network 115, an indication to initiate an emergency attach procedure with respect to UE 105. The emergency attach procedure may prompt private wireless network 115 to bypass certain security requirements (e.g., employee identification/password) for UE 105. In response to the indication to initiate the emergency attach procedure, wireless AP 110 may obtain, from private wireless network 115, an indication that UE 105 is authorized to access private wireless network 115. In response to the indication that UE 105 is authorized to access private wireless network 115, wireless AP 110 may provide guest access to private wireless network 115 on behalf of UE 105.

Initially, UE 105 may send a request to join private wireless network 115 (e.g., an authentication/authenticate request) to wireless AP 110, which may send the authenticate request to enterprise network 125. Enterprise network 125 may in turn send the authenticate request to enterprise AAA server 130. Enterprise AAA server 130 may attempt to authenticate UE 105 with HSS 140. In this case, authentication fails because UE 105 is not registered with HSS 140.

Wireless AP 110 may obtain, from private wireless network 115, an indication that UE 105 is unregistered with private wireless network 115 and, in response, provide, to private wireless network 115, an indication to initiate an emergency attach procedure with respect to UE 105. In one example, the emergency attach procedure may be carried out in accordance with 3rd Generation Partnership Project (3GPP) Technical Specification 24.301 version 16.1.1, published June 2019. Wireless AP 110 may obtain, from private wireless network 115, an indication that UE 105 is authorized to access the private wireless network, and enterprise AAA server 130 may raise an eSIM authenticate failure event with event manager 160. In response, event manager 160 prompts eSIM onboarding manager 155 to send a link to a user portal to wireless AP 110. The link may be a redirect registration portal link whereby the user may input information regarding UE 105.

Wireless AP 110 may provide the link to the user portal to UE 105, and the user may input the information regarding UE 105. Wireless AP 110 may obtain the information regarding UE 105 via the user portal, and may provide the information regarding UE 105 to eSIM onboarding manager 155. Based on the information regarding UE 105, eSIM onboarding manager 155 may trigger an eSIM profile configuration flow between UE 105 and HSS 140. The configuration flow may cause wireless AP 110 to configure a profile of eSIM 165 for guest access. Configuration may occur over any suitable interface(s) between UE 105 and HSS 140, such as predefined 3GPP interface(s).

In one example, HSS 140 may provide configuration information to wireless AP 110. The wireless AP 110 may configure a profile of eSIM 165 based on the configuration information (e.g., activates the profile by writing the profile to eSIM 165). HSS 140 may configure the profile of eSIM 165 via a Subscription Manager-Discovery Server (SM-DS) interface. The SM-DS interface may internally use the LpaSvc Application Programming Interface (API) call for eSIM operations. LpaSvc is a service for handling eSIM-related operation requests. HSS 140 may send an API push to the SM-DS interface which in turn performs an API call for eSIM operations for loading the limited network access eSIM profile on eSIM 165. Wireless AP 110 may also specify a time limit for the guest access (e.g., the profile may define time expiry). That is, the configured profile may have limited time availability from a service point of view.

Policy manager 150 may push a policy to NAD switch 120 with an identifier (e.g., a device tag) of UE 105 to configure a Virtual Local Area Network (VLAN)/Virtual extensible Local Area Network (VxLAN) designated for guest access at NAD switch 120. NAD switch 120 may store one or more Security Group Tags (SGTs), VxLAN contexts, and UE identifiers. There may be one VxLAN designated for all guest traffic, and one or more SGTs for each VxLAN. Once NAD switch 120 has been configured, wireless AP 110 may segment/isolate guest traffic from employee traffic with the appropriate SGT. For example, wireless AP 110 may segment/route traffic obtained from UE 105 over the VxLAN to NAD switch 120, which may in turn route the traffic over the VxLAN in private wireless network 115. Wireless AP 110 may also be configured to address security concerns whereby wireless AP 110 identifies potentially harmful traffic and quarantines that traffic for further analysis (e.g., using a machine learning based algorithm running on wireless AP 110).

Figure 2:
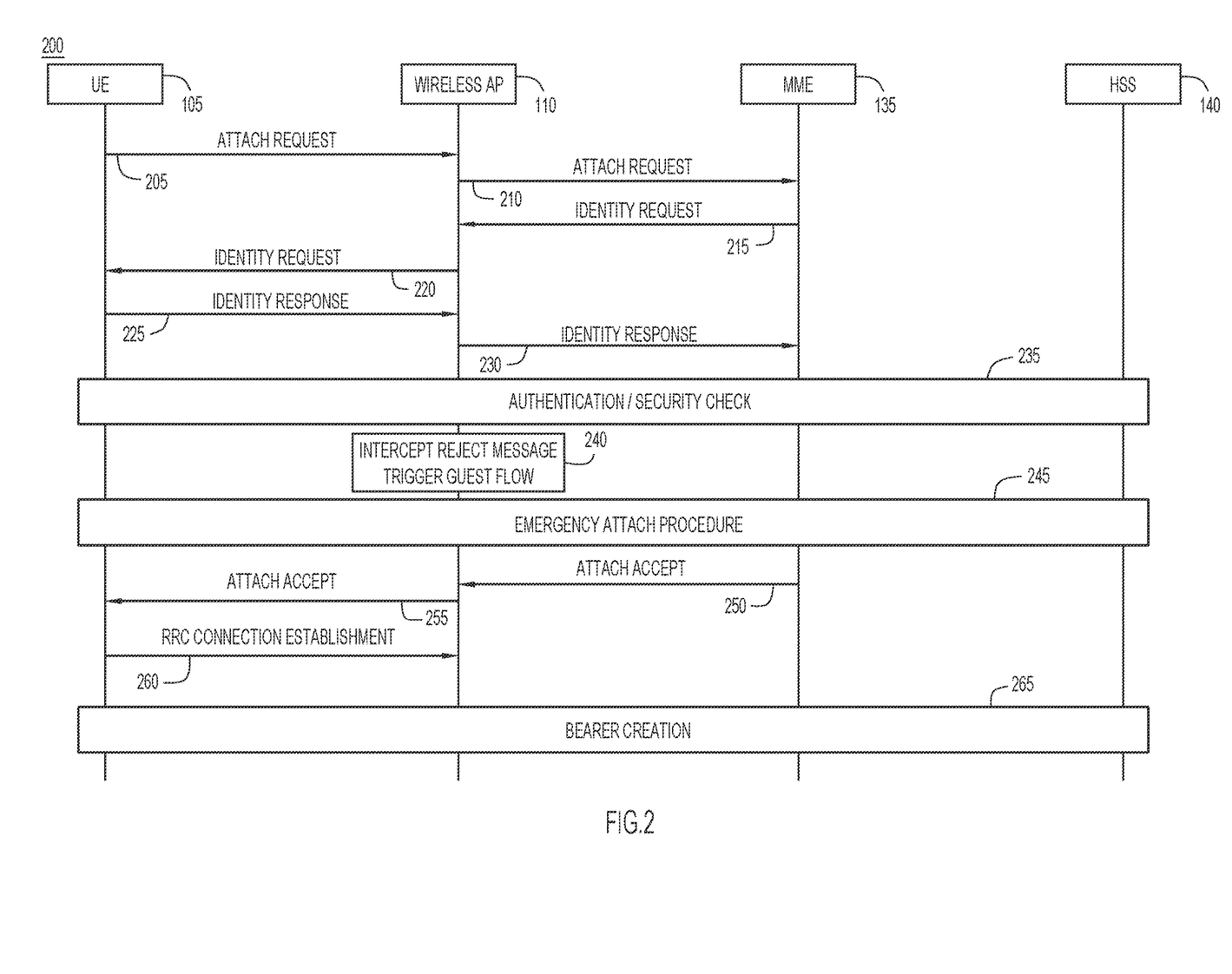
FIG. 2 illustrates a call flow diagram of operations for providing guest access to a private wireless network, according to an example embodiment.

Turning now to FIG. 2, and with continued reference to FIG. 1, shown is call flow diagram 200, which illustrates operations for providing guest access to private wireless network 115. At 205, UE 105 sends an attach request to wireless AP 110. At 210, wireless AP 110 sends the attach request to MME 135. At 215, MME 135 sends an identity request to wireless AP 110. At 220, wireless AP 110 sends the identity request to UE 105. At 225, UE 105 sends an identity response to wireless AP 110. At 230, wireless AP 110 sends the identity response to MME 135. At 235, HSS 140 performs an authentication/security check for UE 105 based on information in the identity response identifying UE 105 and based on information in the repository in HSS 140.

Upon determining that the authentication/security check failed (e.g., that UE 105 is not registered with private wireless network 115), MME 135 may send, to wireless AP 110, an indication that UE 105 is unregistered with private wireless network 115. The indication may be a failure response in the form of an attach reject message indicating that UE 105 is not known to HSS 140 and that UE 105 should be considered unregistered. The attach reject message may also indicate a 3GPP-defined Evolved Packet Core (EPC) Mobility Management (EMM) cause of the rejection. Examples of the causes may include that HSS 140 does not know the International Mobile Subscriber Identity (IMSI) of UE 105, that the Public Land Mobile Network (PLMN) is unidentified, etc.

At 240, wireless AP 110 may intercept the attach reject message from HSS 140 en route to UE 105 and determine the cause of rejection, thereby obtaining the indication that UE 105 is unregistered with private wireless network 115. At 245, wireless AP 110 may provide to MME 135 an indication to initiate an emergency attach procedure with respect to UE 105. This may trigger the guest flow procedure for UE 105. In particular, in response to obtaining the indication to initiate the emergency attach procedure, MME 135 may decide to permit UE 105 to access private wireless network 115 without an authentication/security check. With the "emergency" attach type, for example, MME 135 may skip the authentication and security setup (or accept that authentication may fail) and continue the attach procedure.

At 250, wireless AP 110 obtains, from MME 135, an indication that UE 105 is authorized to access private wireless network 115. The indication may be, for example, an attach accept message. At 255, wireless AP 110 may provide the attach accept message to UE 105 with a link to the user portal to UE 105 as part of the attach procedure. The link may redirect UE 105 to the user portal, which may permit the user of UE 105 to provide UE information (e.g., basic user information) to private wireless network 115 and accept any network access conditions/rules. At 260, UE 105 establishes a Radio Resource Control (RRC) connection with wireless AP 110. At 265, MME 135 may create a bearer based on the UE information from the user portal. Wireless AP 110 may thereby provide guest access to private wireless network 115 on behalf of UE 105.

Figure 3:
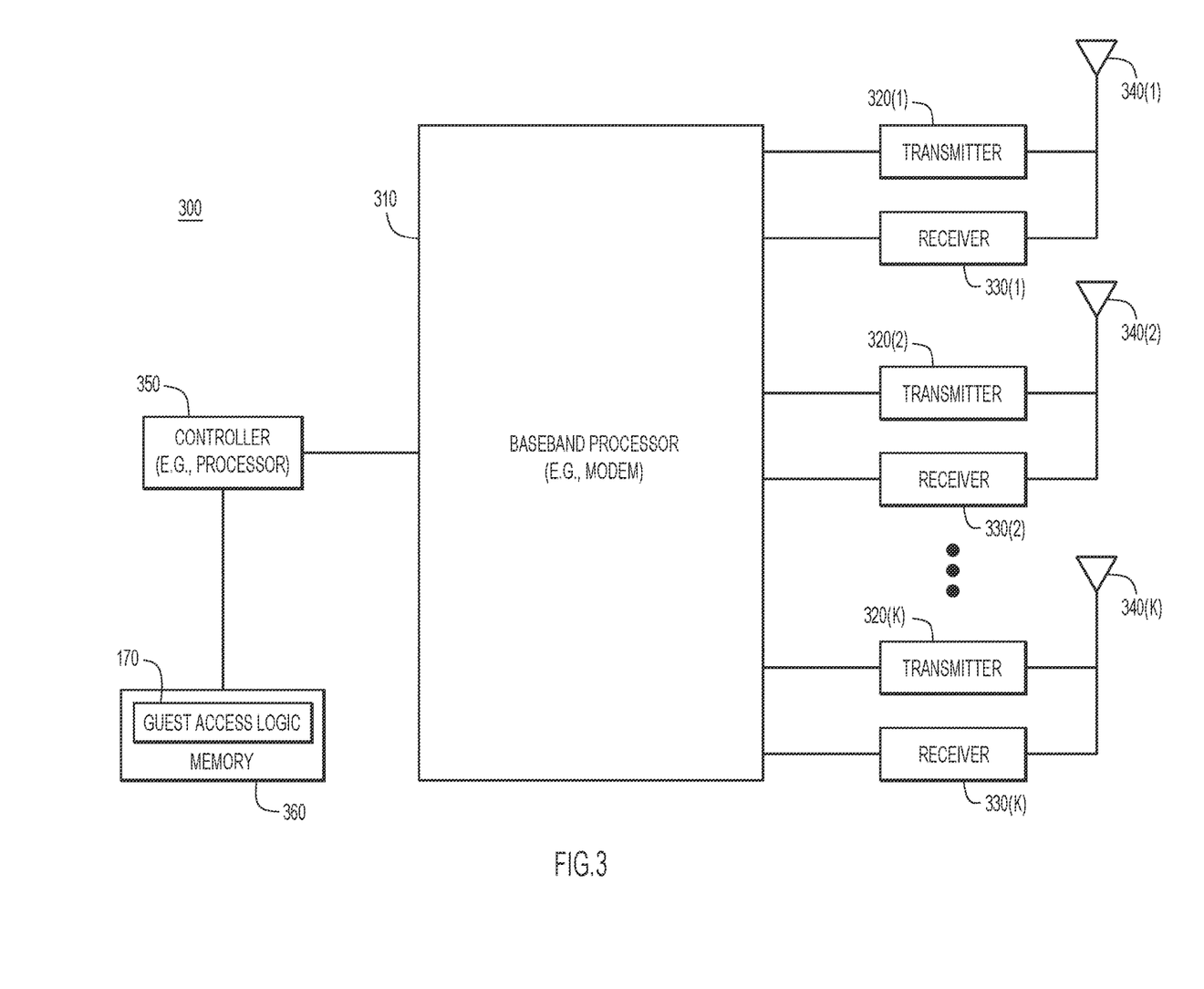
FIG. 3 illustrates a block diagram of a wireless access point device configured to provide guest access to a private wireless network, according to an example embodiment.

Turning now to FIG. 3, and with continued reference to FIG. 1, shown is block diagram 300 of wireless AP 110. Wireless AP 110 includes baseband processor (e.g., modem) 310, one or more transmitters 320(1)-320(K), one or more receivers 330(1)-330(K), one or more antennas 340(1)-340(K), controller 350, and memory 360. Each transmitter 320(1)-320(K) is connected to a corresponding one of plurality of antennas 340(1)-340(K), and likewise each receiver 330(1)-330(K) is connected to a corresponding one of plurality of antennas 340(1)-340(K). Baseband processor 310 may be implemented by fixed or programmable digital logic gates, such as in the form of an Application Specific Integrated Circuit (ASIC), or may be implemented by a dedicated digital signal processor, microprocessor, or microcontroller.

Controller 350 is coupled to baseband processor 310 and provides higher level control for wireless AP 110. Controller 350 may be a microprocessor or microcontroller. Memory 360 stores instructions that controller 350 executes to perform control functions of wireless AP 110. Among these functions are operations performed when controller 350 executes guest access logic 170 stored in memory 360.

Memory 360 may comprise read only memory (ROM), random access memory (RAM), magnetic disk storage media devices, optical storage media devices, flash memory devices, electrical, optical, or other physical/tangible memory storage devices. Thus, in general, memory 360 may comprise one or more tangible (non-transitory) computer readable storage media (e.g., a memory device) encoded with software comprising computer executable instructions and when the software is executed (by controller 350) it is operable to perform the operations described herein.

Figure 4:
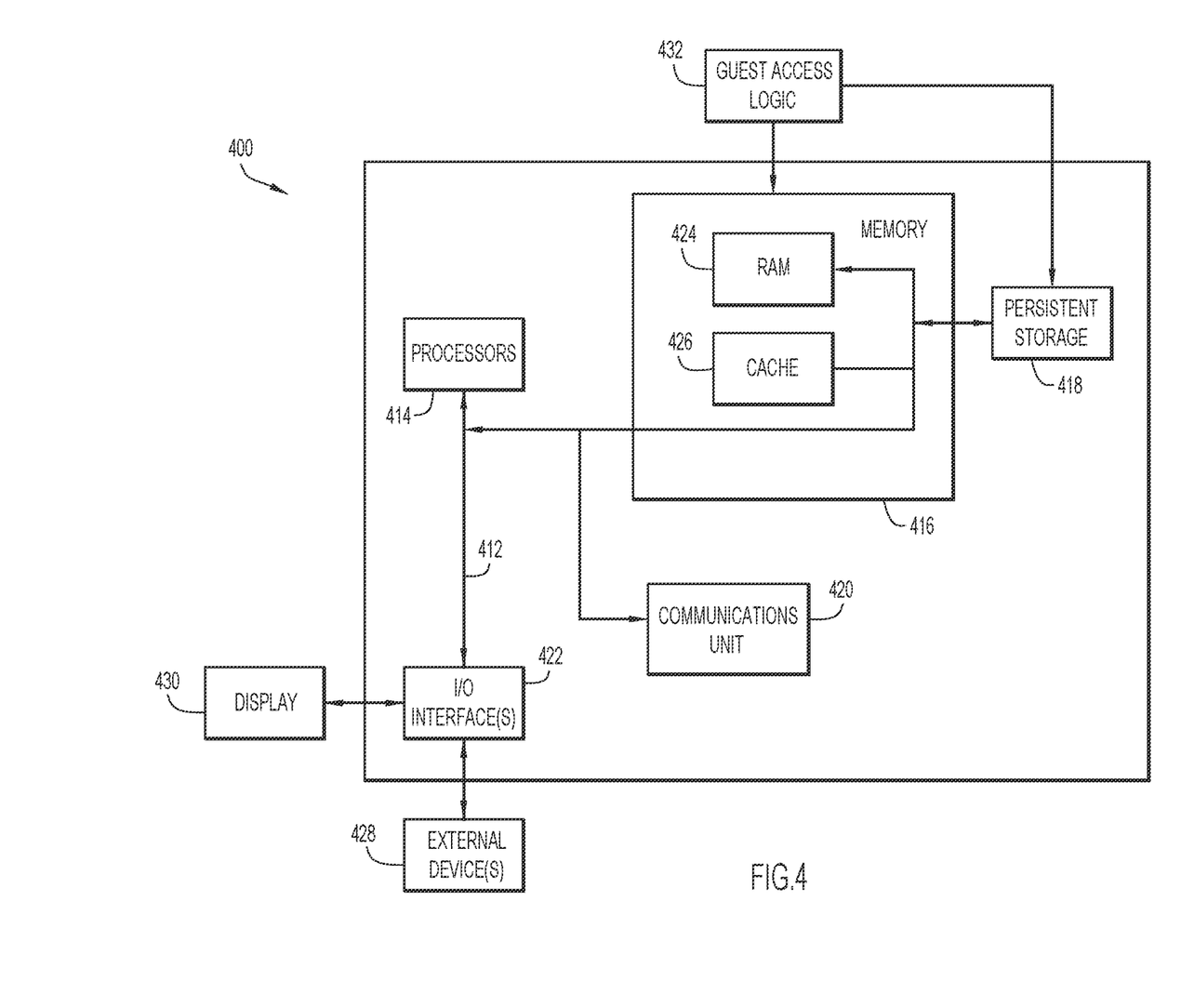
FIG. 4 illustrates a block diagram of a computing device configured to provide guest access to a private wireless network, according to an example embodiment.

FIG. 4 illustrates a block diagram of a computing device 400 (e.g., MME 135/HSS 140) configured to provide guest access to a private wireless network. It should be appreciated that FIG. 4 provides only an illustration of one embodiment and does not imply any limitations with regard to the environments in which different embodiments may be implemented. Many modifications to the depicted environment may be made.

As depicted, computing device 400 includes bus 412, which provides communications between computer processor(s) 414, memory 416, persistent storage 418, communications unit 420, and Input/Output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media. In the depicted embodiment, memory 416 includes Random Access Memory (RAM) 424 and cache memory 426. In general, memory 416 can include any suitable volatile or non-volatile computer readable storage media. Instructions for guest access logic 432 may be stored in memory 416 or persistent storage 418 for execution by computer processor(s) 414. Guest access logic 432 may cause computing device 400 (e.g., MME 135/HSS 140) to perform operations described herein with respect to providing guest access to a private wireless network.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to computing device 400. For example, I/O interface(s) 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

Figure 5:
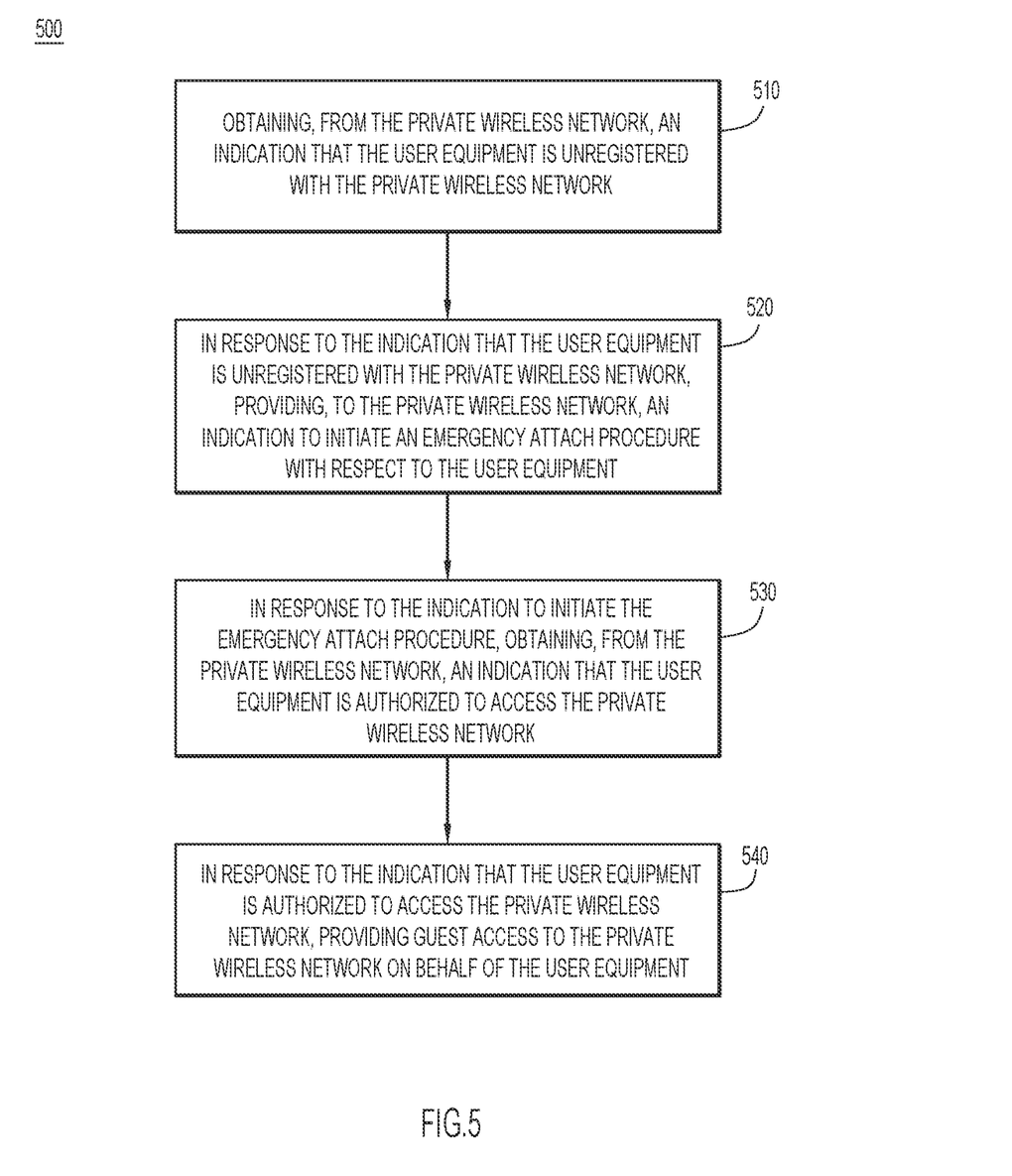
FIG. 5 illustrates a flowchart of a method for providing guest access to a private wireless network, according to an example embodiment.

FIG. 5 is a flowchart of method 500 for providing guest access to a private wireless network. In this example, a wireless AP configured to provide network connectivity between a UE and a private wireless network performs method 500. At 510, wireless AP 110 obtains, from the private wireless network, an indication that the UE is unregistered with the private wireless network. At 520, in response to the indication that the UE is unregistered with the private wireless network, wireless AP 110 provides, to the private wireless network, an indication to initiate an emergency attach procedure with respect to the UE. At 530, in response to the indication to initiate the emergency attach procedure, wireless AP 110 obtains, from the private wireless network, an indication that the UE is authorized to access the private wireless network. At 540, in response to the indication that the UE is authorized to access the private wireless network, wireless AP 110 provides guest access to the private wireless network on behalf of the UE.

Techniques may be described herein for detection of unregistered UEs in CBRS deployments and provisioning of those UEs with an eSIM profile that provides limited services/access. This guest-like workflow may be used in CBRS implementations in enterprise deployments. UEs may be identified by a wireless AP or MME in the private wireless network (e.g., private LTE network) by intercepting attach procedure messages and identifying a specified rejection cause. Guest network services may be provided by faking a successful attach procedure or simulating emergency attach procedure. Detection and onboarding of unregistered UEs may be accomplished using only a single Radio Access Technology (RAT) such as CBRS, and not necessarily other RATs such as Wi-Fi®.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: at a wireless access point configured to provide network connectivity between a user equipment and a private wireless network: obtaining, from the private wireless network, an indication that the user equipment is unregistered with the private wireless network; in response to the indication that the user equipment is unregistered with the private wireless network, providing, to the private wireless network, an indication to initiate an emergency attach procedure with respect to the user equipment; in response to the indication to initiate the emergency attach procedure, obtaining, from the private wireless network, an indication that the user equipment is authorized to access the private wireless network; and in response to the indication that the user equipment is authorized to access the private wireless network, providing guest access to the private wireless network on behalf of the user equipment. In one example, the indication to initiate the emergency attach procedure prompts the private wireless network to bypass one or more security requirements for the user equipment.

In another example, providing the guest access includes: configuring an embedded subscriber identity module profile of the user equipment for the guest access. In a further example, configuring the embedded subscriber identity module profile includes configuring the embedded subscriber identity module profile based on configuration information obtained from a home subscriber server of the private wireless network via a subscription manager-discovery server interface. In another further example, the method further comprises: providing, to the user equipment, a link to a user portal; and obtaining, from the user equipment, user equipment information via the user portal, wherein: configuring the embedded subscriber identity module profile includes configuring the embedded subscriber identity module profile based on the user equipment information. In yet another further example, configuring the embedded subscriber identity module profile includes specifying a time limit for the guest access. In yet another example, the method further comprises: segmenting traffic obtained from the user equipment to a virtual local area network designated for the guest access. In still another example, the private wireless network is a private long term evolution network.

In another form, an apparatus is provided. The apparatus comprises: at least one transmitter associated with a corresponding one of at least one antenna configured to provide network connectivity between a user equipment and a private wireless network; at least one receiver associated with the corresponding one of the at least one antenna; and one or more processors coupled to the at least one transmitter and the at least one receiver, wherein the one or more processors are configured to: obtain, from the private wireless network, an indication that the user equipment is unregistered with the private wireless network; in response to the indication that the user equipment is unregistered with the private wireless network, provide, to the private wireless network, an indication to initiate an emergency attach procedure with respect to the user equipment; in response to the indication to initiate the emergency attach procedure, obtain, from the private wireless network, an indication that the user equipment is authorized to access the private wireless network; and in response to the indication that the user equipment is authorized to access the private wireless network, provide guest access to the private wireless network on behalf of the user equipment.

In another form, one or more non-transitory computer readable storage media are provided. The non-transitory computer readable storage media are encoded with instructions that, when executed by a processor of a wireless access point configured to provide network connectivity between a user equipment and a private wireless network, cause the processor to: obtain, from the private wireless network, an indication that the user equipment is unregistered with the private wireless network; in response to the indication that the user equipment is unregistered with the private wireless network, provide, to the private wireless network, an indication to initiate an emergency attach procedure with respect to the user equipment; in response to the indication to initiate the emergency attach procedure, obtain, from the private wireless network, an indication that the user equipment is authorized to access the private wireless network; and in response to the indication that the user equipment is authorized to access the private wireless network, provide guest access to the private wireless network on behalf of the user equipment.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a wireless access point configured to provide network connectivity between a user equipment and a private wireless network:
      obtaining, from the private wireless network, an indication that the user equipment is unregistered with the private wireless network;
      in response to the indication that the user equipment is unregistered with the private wireless network, providing, to the private wireless network, an indication to initiate an emergency attach procedure with respect to the user equipment;
      in response to the indication to initiate the emergency attach procedure, obtaining, from the private wireless network, an indication that the user equipment is authorized to access the private wireless network; and
      in response to the indication that the user equipment is authorized to access the private wireless network, providing guest access to the private wireless network on behalf of the user equipment by configuring an embedded subscriber identity module profile of the user equipment for the guest access.

2. The method of claim 1, wherein the indication to initiate the emergency attach procedure prompts the private wireless network to bypass one or more security requirements for the user equipment.

3. The method of claim 1, wherein:
   configuring the embedded subscriber identity module profile includes configuring the embedded subscriber identity module profile based on configuration information obtained from a home subscriber server of the private wireless network via a subscription manager discovery server interface.

4. The method of claim 1, further comprising:
   providing, to the user equipment, a link to a user portal; and
   obtaining, from the user equipment, user equipment information via the user portal, wherein:
   configuring the embedded subscriber identity module profile includes configuring the embedded subscriber identity module profile based on the user equipment information.

5. The method of claim 1, wherein configuring the embedded subscriber identity module profile includes specifying a time limit for the guest access.

6. The method of claim 1, further comprising:
   segmenting traffic obtained from the user equipment to a virtual local area network designated for the guest access.

7. The method of claim 1, wherein the private wireless network is a private long term evolution network.

8. An apparatus comprising:
   at least one transmitter associated with a corresponding one of at least one antenna configured to provide network connectivity between a user equipment and a private wireless network;
   at least one receiver associated with the corresponding one of the at least one antenna; and
   one or more processors coupled to the at least one transmitter and the at least one receiver, wherein the one or more processors are configured to:
      obtain, from the private wireless network, an indication that the user equipment is unregistered with the private wireless network;

in response to the indication that the user equipment is unregistered with the private wireless network, provide, to the private wireless network, an indication to initiate an emergency attach procedure with respect to the user equipment;

in response to the indication to initiate the emergency attach procedure, obtain, from the private wireless network, an indication that the user equipment is authorized to access the private wireless network; and in response to the indication that the user equipment is authorized to access the private wireless network, provide guest access to the private wireless network on behalf of the user equipment by configuring an embedded subscriber identity module profile of the user equipment for the guest access.

9. The apparatus of claim 8, wherein the indication to initiate the emergency attach procedure prompts the private wireless network to bypass one or more security requirements for the user equipment.

10. The apparatus of claim 8, wherein the one or more processors are further configured to:

configure the embedded subscriber identity module profile based on configuration information obtained from a home subscriber server of the private wireless network via a subscription manager discovery server interface.

11. The apparatus of claim 8, wherein the one or more processors are further configured to:

provide, to the user equipment, a link to a user portal;

obtain, from the user equipment, user equipment information via the user portal; and configure the embedded subscriber identity module profile based on the user equipment information.

12. The apparatus of claim 8, wherein the one or more processors are further configured to:

specify a time limit for the guest access.

13. The apparatus of claim 8, wherein the one or more processors are further configured to:

segment traffic obtained from the user equipment to a virtual local area network designated for the guest access.

14. The apparatus of claim 8, wherein the private wireless network is a private long term evolution network.

15. One or more non-transitory computer readable storage media encoded with instructions that, when executed by a processor of a wireless access point configured to provide network connectivity between a user equipment and a private wireless network, cause the processor to:

obtain, from the private wireless network, an indication that the user equipment is unregistered with the private wireless network;

in response to the indication that the user equipment is unregistered with the private wireless network, provide, to the private wireless network, an indication to initiate an emergency attach procedure with respect to the user equipment;

in response to the indication to initiate the emergency attach procedure, obtain, from the private wireless network, an indication that the user equipment is authorized to access the private wireless network; and in response to the indication that the user equipment is authorized to access the private wireless network, provide guest access to the private wireless network on behalf of the user equipment by configuring an embedded subscriber identity module profile of the user equipment for the guest access.

16. The one or more non-transitory computer readable storage media of claim 15, wherein the indication to initiate the emergency attach procedure prompts the private wireless network to bypass one or more security requirements for the user equipment.

17. The one or more non-transitory computer readable storage media of claim 15, wherein the instructions further cause the processor to:

segment traffic obtained from the user equipment to a virtual local area network designated for the guest access.

18. The one or more non-transitory computer readable storage media of claim 15, wherein the instructions further cause the processor to:

configure the embedded subscriber identity module profile based on configuration information obtained from a home subscriber server of the private wireless network via a subscription manager—discovery server interface.

19. The one or more non-transitory computer readable storage media of claim 15, wherein the instructions further cause the processor to:

provide, to the user equipment, a link to a user portal;

obtain, from the user equipment, user equipment information via the user portal; and configure the embedded subscriber identity module profile based on the user equipment information.

20. The one or more non-transitory computer readable storage media of claim 15, wherein the instructions further cause the processor to:

specify a time limit for the guest access.

* * * * *

UNITED STATES PATENT AND TRADEMARK OFFICE
CERTIFICATE OF CORRECTION

PATENT NO. : 11,051,172 B2
APPLICATION NO. : 16/539428
DATED : June 29, 2021
INVENTOR(S) : Avula et al.

Page 1 of 1

It is certified that error appears in the above-identified patent and that said Letters Patent is hereby corrected as shown below:

In the Claims

Claim 3, Column 12, Lines 35-36, please replace "manager discovery" with --manager – discovery--

Claim 10, Column 13, Line 26, please replace "manager discovery" with --manager – discovery--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*